United States Patent [19]
Ferrante et al.

[11] Patent Number: 5,894,366
[45] Date of Patent: Apr. 13, 1999

[54] ANTI-REFLECTIVE COATING

[75] Inventors: Ronald Alfred Ferrante, St. Charles, Mo.; Rudolf Herman Ott, Batchtown, Ill.

[73] Assignee: McDonnell Douglas

[21] Appl. No.: 08/907,966

[22] Filed: Aug. 11, 1997

Related U.S. Application Data

[63] Continuation of application No. 08/533,759, Sep. 26, 1995, abandoned.

[51] Int. Cl.[6] .................................................. G02B 1/10
[52] U.S. Cl. ................................... 359/581; 359/586
[58] Field of Search .................................. 359/581, 722, 359/586, 588, 580

[56] References Cited

U.S. PATENT DOCUMENTS

| | | | |
|---|---|---|---|
| 3,185,020 | 5/1965 | Thelen | 359/586 |
| 3,356,522 | 12/1967 | Libbert | 359/588 |
| 3,432,225 | 3/1969 | Rock | 359/588 |
| 3,565,509 | 2/1971 | Sulzbach | 359/588 |
| 3,706,485 | 12/1972 | Fawcett et al. | 359/588 |
| 3,781,090 | 12/1973 | Sumita | 359/588 |
| 4,161,560 | 7/1979 | Kienel | 428/213 |
| 4,726,654 | 2/1988 | Kimura et al. | 359/588 |
| 5,392,156 | 2/1995 | Kumagai et al. | 359/586 |
| 5,513,038 | 4/1996 | Abe | 359/580 |
| 5,532,871 | 7/1996 | Hashimoto et al. | 359/359 |

*Primary Examiner*—Jon W. Henry
*Assistant Examiner*—Mark A. Robinson
*Attorney, Agent, or Firm*—Dale B. Halling

[57] ABSTRACT

A color selective, anti-reflective optical coating has a substrate (42), a first layer (44) and a second layer (46). The first layer (44) has an index of refraction that is 25% to 39% greater than an index of refraction of the substrate (42). The first layer (44) has a width of between 12.31 nanometers and 13.41 nanometers. The second layer (46) has an index of refraction that is between 1% and 17.5% less than the index of refraction of the substrate (42). The second layer (46) has a width between 118.32 nanometers and 130.78 nanometers. When the color selective, anti-reflective optical coating is applied to a head lamp lens (40), it significantly increases the output of the head lamp (20) and has a distinctive tint.

17 Claims, 3 Drawing Sheets

ANTI-REFLECTIVE COATING

This is a continuation of application Ser. No. 08/533,759, filed Sep. 26, 1995 and now abandoned.

FIELD OF THE INVENTION

The present invention relates generally to optical coatings and more particularly to anti-reflective coatings.

BACKGROUND OF THE INVENTION

The automotive industry is trying develop brighter and better head lamps for automobiles. The conventional incandescent lamp cannot be modified to increase its brightness, so the automotive industry is turning to halogen lamps to improve the output brightness of car head lamps. Halogen lamps have significantly higher output brightness.

The automotive companies are investigating arc-lamps to improve lamp brightness. Arc-lamps are still experimental. Arc-lamp lifetimes have not been proven to be adequate and the cost of arc lamps are still too high.

Another possible solution to the brightness concerns of incandescent lights or halogen lamps is to use an anti-reflection coating on the head lamp lens. A head lamp 20 is shown in FIG. 1. The head lamp 20 comprises a light bulb 22, which can be incandescent, halogen or arc lamp. A reflector 24 directs the light forward. A head lamp lens 26 protects the light bulb 22 and reflector 24 from bugs and other objects. The head lamp lens 26 is commonly made of polycarbonate (older models were made from glass). The reflection from each surface of the polycarbonate is about 5%. This results in a 10% reduction in the output optical power after passing through the head lamp lens 26.

Anti-reflective coatings use the principle of destructive interference to reduce the reflectance from a surface. A glass pane had an index of refraction (n=1.5) that differs from the index of refraction of the surrounding air (n=1.0). The discontinuity in the index of refraction results in a certain percentage of the impinging light being reflected. By placing a coating on the glass of the appropriate thickness and an index of refraction, it is possible to create destructive interference between the reflection from the air-coating boundary and the coating-glass boundary.

A common anti-reflective coating is shown in FIG. 2. A glass substrate 30 has an index of refraction of about 1.5 and is coated with magnesium fluoride 32. The magnesium fluoride 32 is applied with a thickness 34 equal to ¼ of the wavelength of the center of the visible spectrum (550 nm). The ¼ wavelength coating results in a ½ wavelength phase difference for the reflected light from the substrate 30 magnesium fluoride boundary. As a result this light is 180 degrees (destructive interference) out of phase with the light reflected from the air- magnesium fluoride boundary. To eliminate any reflection it is necessary for the amplitude of each of the reflected light waves to be equal. The magnesium fluoride has an index of refraction of 1.38 so the thickness 34 is 99.6 nanometers (550 nm* ¼* 1/1.38). The magnesium fluoride coating reduces the reflectance at each surface to about 1% or 2% through the head lamp lens. However, this still has a 2% reflectance.

Thus there exists a need for an optical coating that further reduces the reflectance from the head lamp lens.

SUMMARY OF THE INVENTION

An invention that solves these problems and has additional benefits is a two layer optical coating wherein the first layer has an index of refraction greater than an index of refraction of the substrate and has a thickness less than 65.5 nanometers. The second layer has an index of refraction less than the index of refraction of the substrate and has a thickness greater than 99.6 nanometers.

DETAILED DESCRIPTION OF THE DRAWINGS

Figure 1:
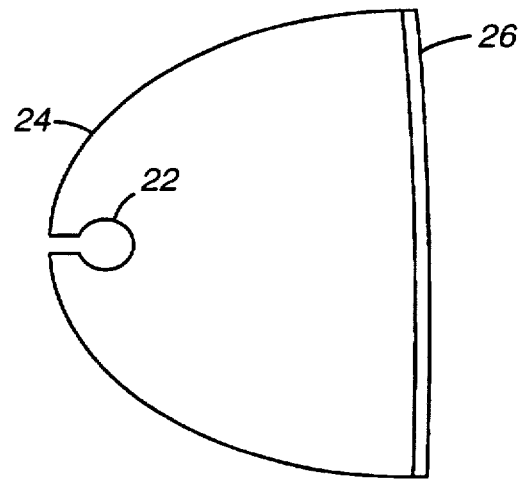
FIG. 1 is a schematic diagram of a head lamp.
Figure 2:
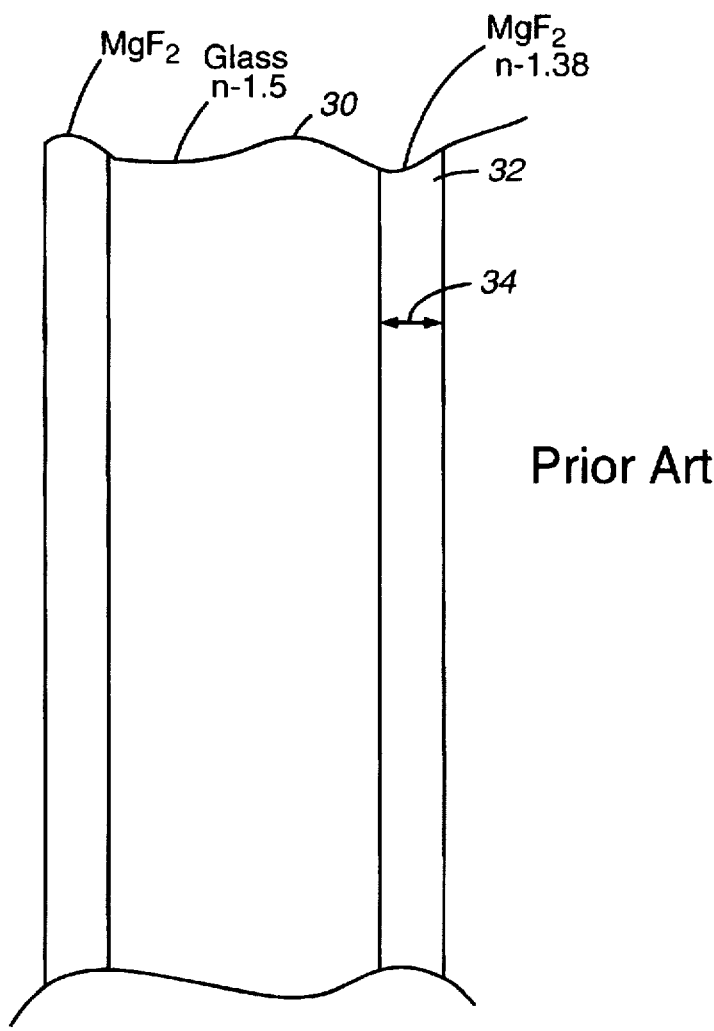
FIG. 2 is a cross section of a prior art anti-reflective coating on a substrate.
Figure 3:
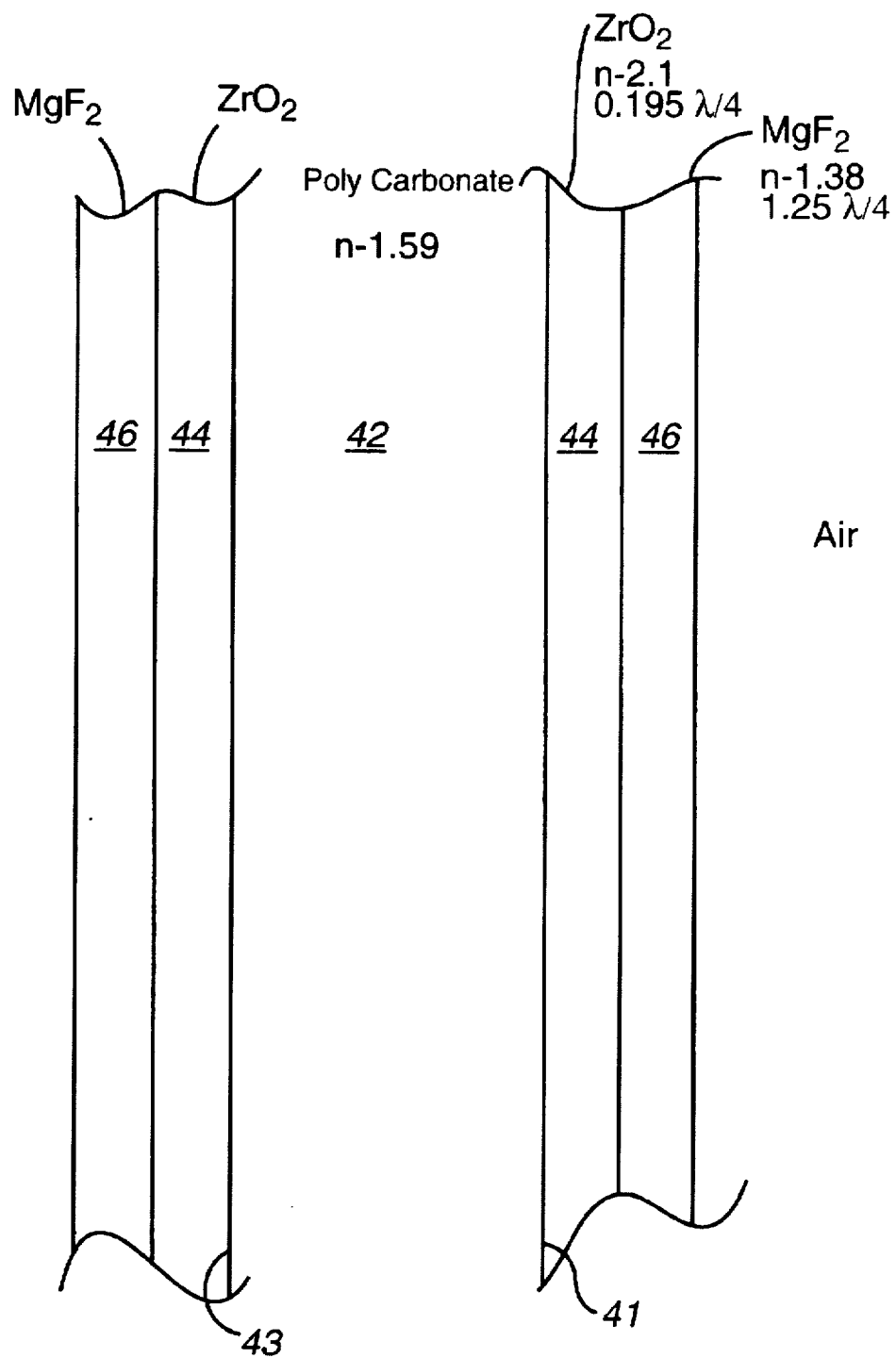
FIG. 3 is a cross section of a color selective, anti-reflective coating on a substrate, according to the invention.

A cross section of a head lamp 40 coated with a color selective, anti-reflective coating is shown in FIG. 3. A polycarbonate material 42 acts as the substrate in one embodiment. Polycarbonate has an index of refraction of 1.59. The substrate has a first surface 41 and a second surface 43. A first layer (high index layer) 44 is adjacent to the first surface 41 and in the preferred embodiment the first layer 44 is also placed adjacent to the second surface 43. The first layer 44 is made from a material having an index of refraction that is between 25% to 39% greater than the index of refraction of the substrate. For a substrate 42 of polycarbonate the preferred index of refraction of the first layer is 2.1. A material that has both good physical properties and the proper index of refraction is Zirconium dioxide ($ZrO_2$) or a composition including Zirconium dioxide.

The thickness of the first layer is between 0.185 and 0.205 quarter wavelengths, where the wavelength of concern is the center of the visible spectrum or 550 nanometers. In preferred embodiment the first layer has a thickness of 0.195 quarter wavelengths. When Zirconium dioxide is used for the first layer the thickness is between 12.13 nanometers and 13.41 nanometers.

The second layer (low index layer) 46 has a thickness between 1.19 and 1.31 quarter wavelengths (at 550 nm). In the preferred embodiment the second layer has a thickness of 1.25 quarter wavelengths. In one embodiment the second layer has an index of refraction between 1% and 17.5% less than the index of refraction of substrate 42. When the substrate 42 is made of polycarbonate, the preferred embodiment has the second layer having an index of refraction of 1.38. A material that meets these requirements and has excellent physical properties is magnesium fluoride.

In another embodiment, the first layer has a thickness that is an odd multiple of 0.195 quarter wavelengths and the second layer has a thickness of the odd multiple times 1.25 wavelengths. This embodiment is not as good an anti-reflective coating, but has increased color selectivity.

Figure 4:
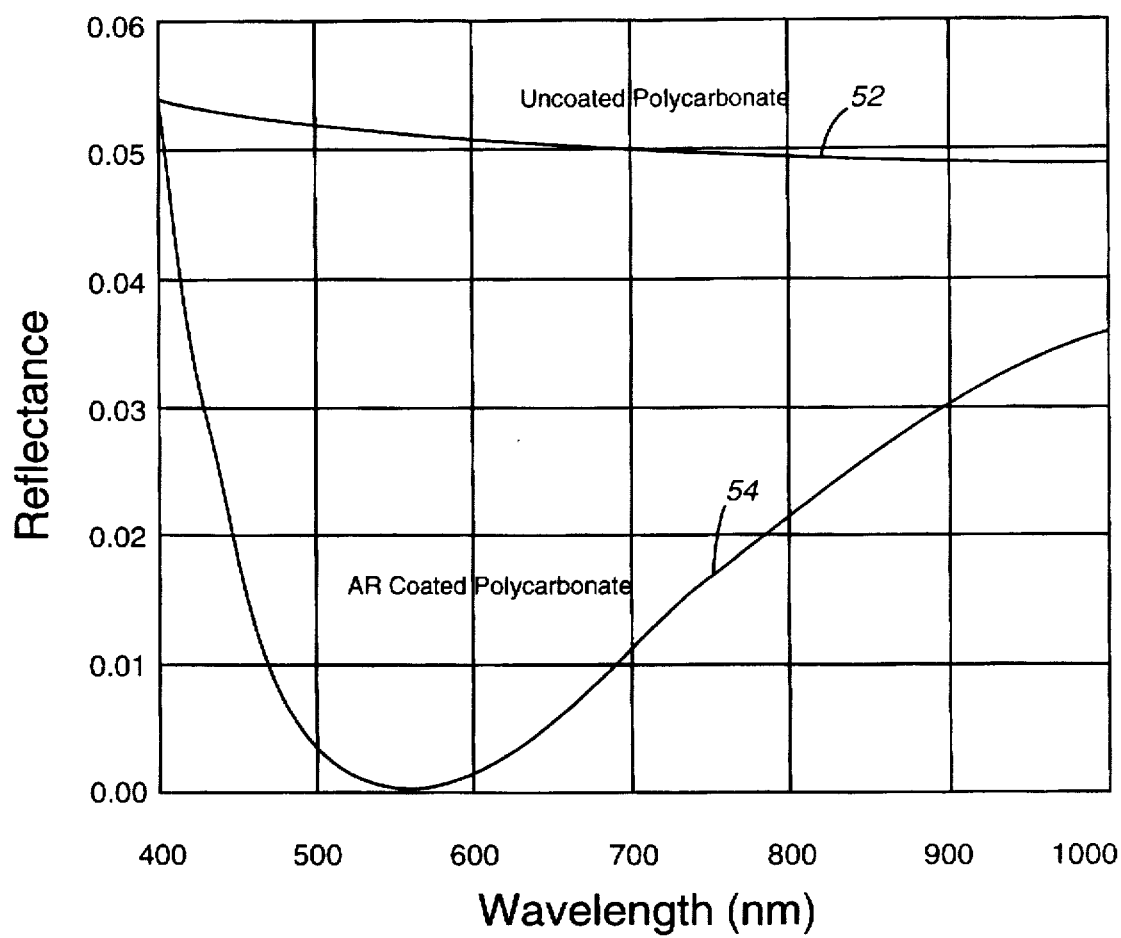
FIG. 4 is a graph of the reflectance versus wavelength for an uncoated substrate and a substrate coated with the color selective, antireflective coating of FIG. 3.

Tests were performed on a color selective, anti-reflective coating according to the invention. The substrate 42 was made of polycarbonate. The first layer 44 was made of Zirconium dioxide, having an index of refraction of 2.1, with a thickness of 0.195 quarter wavelengths. The second layer 46 was made of magnesium fluoride, having an index of refraction of 1.38, with a thickness of 1.25 quarter wavelengths. The results are shown in FIG. 4. The top curve 52 is the reflectance as a function of wavelength for uncoated polycarbonate. The lower curve 54 is the reflectance as a function of wavelength for polycarbonate coated in the manner described above. As can be seen from the graph, the reflectance at 550 nanometers is almost zero for the coated polycarbonate. The coated polycarbonate's reflectance is not flat as a function wavelength, but decreases as it moves away from 550 nanometers. This has two useful results. One, the output from a head lamp made with this optical coating is increased near the central eye response. Two, the optical coating reflects purple light and red light more than the center of the visible spectrum. As a result, the head lamp lens has reddish-purple color that helps the customer identify the head lamp lens as high technology.

Thus there has been described a novel color selective, antireflection coating. When the color selective, antireflection coating is applied to a head lamp lens on an automobile, it significantly increases the brightness of the head lamp. In addition, it produces a head lamp lens with a distinctive color tint. While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claimed is:

1. A color selective anti-reflective, two layer coating which is antireflective at a design wavelength, comprising:
   a first layer adjacent to a substrate, having an optical thickness near 0.195 quarter wavelengths, the first layer having a first index of refraction; and
   a second layer having an optical thickness near 1.25 quarter wavelengths, the second layer having a second index of refraction.

2. The color selective anti-reflective coating of claim 1, wherein the first layer is made of a, material selected from the group Zirconium dioxide or mixtures of Zirconium dioxide and the substrate is a polycarbonate.

3. The color selective anti-reflective coating of claim 2, wherein the second layer is made of magnesium fluoride.

4. The color selective anti-reflective coating of claim 3, wherein the optical thickness of the first layer is an odd multiple integer of 0.195 quarter wavelengths and the optical thickness of the second layer is the odd multiple integer times 1.25 quarter wavelengths.

5. An improved head lamp lens having a color selective anti-reflective two layer coating which is antireflective at a design wavelength, comprising:
   a substrate having a first surface and a second surface the substrate formed of a polycarbonate;
   a high index layer having an optical thickness less than one twentieth of a wavelength and adjacent the first surface; and
   a low index layer having an optical thickness greater than one quarter of the wavelength and adjacent to the high index layer.

6. The improved head lamp lens of claim 5, wherein the substrate has an index of refraction of around 1.59.

7. The improved head lamp lens of claim 5, wherein a high index layer is adjacent to the second surface.

8. The improved head lamp lens of claim 5, wherein the high index layer has an index of refraction of about 2.1.

9. The improved head lamp lens of claim 5, wherein the low index layer has an index of refraction of about 1.38.

10. The improved head lamp lens of claim 5, wherein the optical thickness of the high index layer is between 0.185 and 0.205 quarter wavelengths.

11. The improved head lamp lens of claim 5, wherein the optical thickness of the low index layer is between 1.19 and 1.31 quarter wavelengths.

12. The improved head lamp lens of claim 5, wherein the optical thickness of the high index layer is an odd multiple integer of between 0.185 and 0.205 quarter wavelengths and the optical thickness of the low index layer an the odd multiple integer of between 1.19 and 1.31 quarter wavelengths.

13. A color selective anti-reflective two layer coating for visible light having a spectrum centered around 550 nanometers, comprising:
   a first layer with an index of refraction greater than an index of refraction of a substrates formed of a polycarbonate, to which the first layer is applied, and having a thickness less than 65.6 nanometers, the first layer formed from a first material; and
   a second layer with an index of refraction less than an index of refraction of a substrate to which it is applied, and having a thickness greater than 99.6 nanometers, the second layer formed from a second material.

14. The color selective anti-reflective coating of claim 13, wherein the index of refraction of the first layer is between 25% to 39% greater than the index of refraction of the substrate.

15. The color selective anti-reflective coating of claim 13, wherein-the index of refraction of the second layer is between 1% to 17.5% less than the index of refraction of the substrate.

16. The color selective anti-reflective coating of claim 13, wherein the thickness of the first layer is between 12.13 nanometers and 13.41 nanometers.

17. The color selective anti-reflective coating of claim 13, wherein the thickness of the second layer is between 118.32 nanometers and 130.78 nanometers.

* * * * *